United States Patent
Hong et al.

(10) Patent No.: US 7,528,712 B2
(45) Date of Patent: May 5, 2009

(54) SYSTEM AND METHOD FOR TESTING RFID DEVICES

(75) Inventors: Min-Kao Hong, Taichung (TW);
Hsin-Teng Lin, Yunlin County (TW);
Shao-Wei Chung, Hsinchu County (TW); Yu-Ying Huang, Miaoli County (TW); Jen-Chao Lu, Taichung (TW);
Li-Huei Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 331 days.

(21) Appl. No.: 11/702,712

(22) Filed: Feb. 5, 2007

(65) Prior Publication Data

US 2007/0279212 A1 Dec. 6, 2007

Related U.S. Application Data

(60) Provisional application No. 60/811,529, filed on Jun. 6, 2006.

(51) Int. Cl.
*G08B 29/00* (2006.01)
(52) U.S. Cl. .................................. 340/514; 340/572.1

(58) Field of Classification Search ................. 340/514, 340/572.1, 673, 676, 679, 680, 684, 685, 340/10.1; 700/213, 214, 228, 229, 230
See application file for complete search history.

(56) References Cited

U.S. PATENT DOCUMENTS

| 6,104,291 | A | 8/2000 | Beauvillier et al. | |
|---|---|---|---|---|
| 7,073,712 | B2 * | 7/2006 | Jusas et al. | 340/572.1 |
| 7,225,992 | B2 * | 6/2007 | Forster | 340/572.1 |
| 7,306,162 | B2 * | 12/2007 | Forster | 235/492 |
| 7,400,255 | B2 * | 7/2008 | Horch | 340/10.1 |
| 7,414,533 | B2 * | 8/2008 | Sweeney, II | 340/514 |
| 2006/0006885 | A1 | 1/2006 | Helmut Bode et al. | |
| 2006/0038687 | A1 | 2/2006 | White et al. | |

FOREIGN PATENT DOCUMENTS

| TW | 330297 B | 4/1998 |
|---|---|---|
| TW | 573336 B | 1/2004 |

* cited by examiner

*Primary Examiner*—John A Tweel, Jr.
(74) *Attorney, Agent, or Firm*—Alston & Bird LLP

(57) ABSTRACT

A system for testing RFID devices is introduced. The system includes a carrier plate configured for carrying an RFID device, a cable configured for supporting the carrier plate, a pulley apparatus configured for transporting the carrier plate along the cable, and a controller configured for adjusting test parameters in testing the RFID device.

22 Claims, 5 Drawing Sheets

SYSTEM AND METHOD FOR TESTING RFID DEVICES

This application claims benefit of U.S. Provisional Application 60/811,529, filed Jun. 6, 2006.

BACKGROUND OF THE INVENTION

The present invention generally relates to radio frequency identification (RFID) devices, and more particularly, to a system and method for testing RFID devices under a plurality of test conditions.

Radio frequency identification (RFID) technology has been used in the automatic identification and data capture (AIDC) industry for, such as, inventory management. As a wireless communication technique, the RF technology covers various applications in the industrial, commercial and retail supply chains, such as in freight containers, reusable transport items or containers, transport units, product packaging, and product tagging.

The performance characteristics of RFID devices (tags and readers) may vary as the applications and particular RF air interface vary. It may be desirable to match RFID performance characteristics with a particular application. As an example, "ISO/IEC 18046" established by ISO (International Standards Organization) introduces a standard for testing RFID devices under different testing parameters. To test an RFID device moving at a relatively high speed, which is one of the testing parameters, it may generally require a conveyor system including, for example, conveyor belts and forklift devices, which in turn may occupy a relatively large space. It may be desirable to have a system and a method configured for testing RFID for applications with high-speed movements or in accordance with the ISO/IEC 18046 standard. Furthermore, it may be desirable to have a system and method that may test the RFID devices at a relatively high speed in a relatively small space.

BRIEF SUMMARY OF THE INVENTION

Examples of the present invention may provide a system configured for testing RFID devices. The system comprises a carrier plate configured for carrying an RFID device, a first cable configured for supporting the carrier plate, a pulley apparatus configured for transporting the carrier plate along the first cable, and a controller configured for adjusting test parameters in testing the RFID device.

Examples of the present invention may provide a system for testing RFID devices. The system comprises a carrier plate including a first portion and a second portion pivotally connected to the first portion, a cable configured for supporting the carrier plate, a pulley apparatus configured for transporting the carrier plate along the cable, and a rotating device pivotally connected to the second portion of the carrier plate.

Examples of the present invention may provide a method of testing an RFID device, the method comprising providing a carrier plate including a first portion and a second portion, pivotally connecting the second portion to the first portion, providing a cable configured for supporting the carrier plate, providing a pulley apparatus configured for transporting the carrier plate along the cable, providing a rotating device, pivotally connecting the rotating device to the second portion of the carrier plate, rotating the second portion with respect to the first portion to position the RFID device at a first orientation, and rotating the rotating device with respect to the second portion to position the RFID device at a second orientation.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions.

Table I below is an exemplary list of general test conditions for a short-range RFID system (e.g., within 10 meters) according to the ISO/IEC 18046 standard. Referring to Table I, the first part of the test conditions may correspond to the characteristics of a device under test (DUT) itself, including characteristics such as "Tag population", "Tag geometry", "Tag volume" and "Tag mounting material." The second part of the test conditions may correspond to the setup of the testing environment, including the test item such as "Distance", "Tag orientation", "Tag speed", "RF environment", "Data transaction" and "Interrogator antenna height." The "Range" column includes certain test parameters under the ISO/IEC 18046. The test may be conducted with a procedure under which the intrinsic characteristics of a DUT remain unchanged, while the conditions associated with the testing environment vary for simulating various applications.

TABLE I

| Condition | Range | Remark |
|---|---|---|
| Tag population | 1, 10, 20, 50, 100 | Intrinsic |
| Tag geometry | Linear, array, volume | characteristics |
| Tag volume | 0.016, 0.125, 1 m$^3$ | for DUT |
| Tag mounting material | Paper, wood, glass, plastic, metal | |
| Distance | 0-10 meters | Testing |
| Tag orientation | 0, 30, 60, 90 degrees, random | environment |
| Tag speed | 0, 1, 2, 5, 10 m/s | setup |
| RF environment | Benign, moderate, congested | |
| Data transaction | 1, 8, 16, 32 bytes | |
| Interrogator antenna height | 0.5, 1, 2, 3 meters | |

Figure 1:
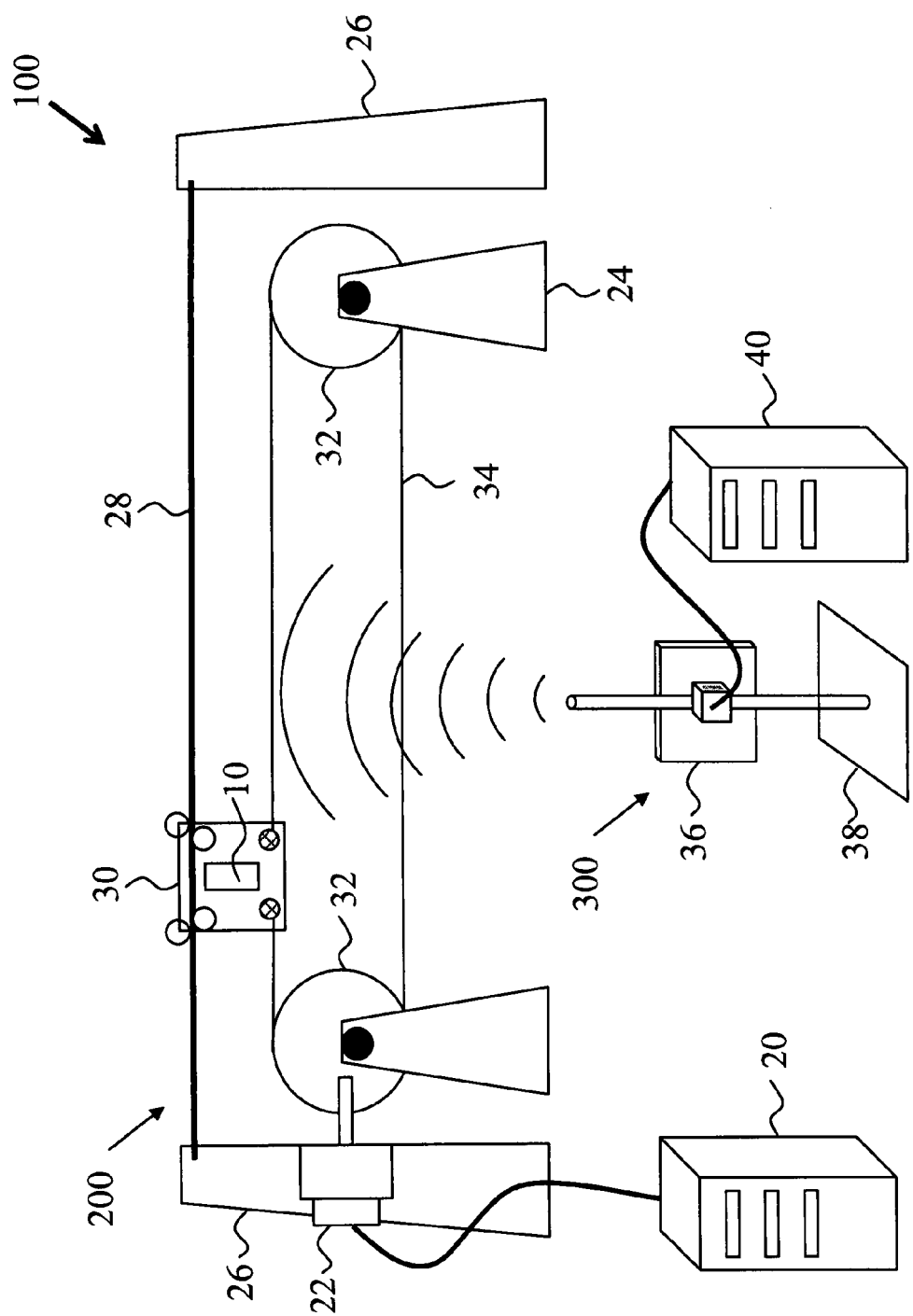
FIG. 1 is a schematic diagram of an RFID testing system according to one example of the present invention.

FIG. 1 is a schematic diagram of an RFID testing system 100 according to one example of the present invention. Referring to FIG. 1, the RFID testing system 100 may include tag equipment 200 and reader equipment 300. The tag equipment 200 may be configured for testing an RFID tag at the test conditions such as "Tag orientation" or "Tag speed" listed in Table 1. The reader equipment 300 may be configured for testing the RFID tag at the test conditions such as "Distance", "RF environment" and "Interrogator antenna height" listed in Table 1. Consequently, various performance characteristics of an RFID tag and/or an RFID reader for different user applications may be evaluated.

Referring to FIG. 1, the tag equipment 200 may include a tag control system 20, a motor 22, a pulley apparatus 24, a holder 26, a main support cable 28 and a carrier plate 30. The main support cable 28 is mounted on the holder 26 with appropriate tension for supporting the carrier plate 30 at a predetermined height. In other examples, a support rail may be used to support the carrier plate 30. The carrier plate 30, dependent at an upper side from the main support cable 28, is configured for moving along the main support cable 28 at different speeds. The pulley apparatus 24 includes two wheels 32 and a cable 34. Each of the wheels 32 may include a grooved rim for accommodating the cable 34. The carrier plate 30 is supported at a lower side by the cable 34 so that the carrier plate 30 may move along the main support cable 28 as the cable 34 moves. The motor 22, controlled by the tag control system 20, is mounted on the holder 26 for driving the pulley apparatus 24 so that the wheels 32 may rotate around a stationary axle at a predetermined speed. A DUT, such as an RFID tag 10, may be attached to the carrier plate 30 at different tag orientations with respect to the reader equipment 300. As a result, the RFID tag 10 attached to the carrier plate 30 may move at a predetermined speed along the main support cable 28 and at a predetermined orientation in evaluating performance characteristics in a predetermined user application.

The reader equipment 300 may include an RFID reader 36, an adjuster 38, and a reader control system 40. The reader equipment 300 is disposed at a predetermined distance with respect to the tag equipment 200. The RFID reader 36, mounted on the adjuster 38 and including a built-in antenna, is configured for establishing an RF field (hereafter referred to as "read zone") to interact with the tag equipment 200. Under the control of the reader control system 40, the adjuster 38 may move towards or away from the tag equipment 200 so as to modify the test condition "Distance" listed in Table 1. The adjuster 38 is also configured for raising or lowering the height of the RFID reader 36 so as to modify the test condition "Interrogator antenna height" listed in Table 1. As the RFID tag 10 attached to the carrier plate 30 passes the read zone, the RFID reader 36 may access the RFID tag 10 for a predetermined number of times. Since the RFID tag 10 may pass the read zone under various test conditions (at different speeds or different orientations), data corresponding to each test condition may be collected by the RFID reader 36 and sent to the reader control system 40 for evaluating the performance characteristics of the RFID tag 10 in various user applications.

Figure 2:
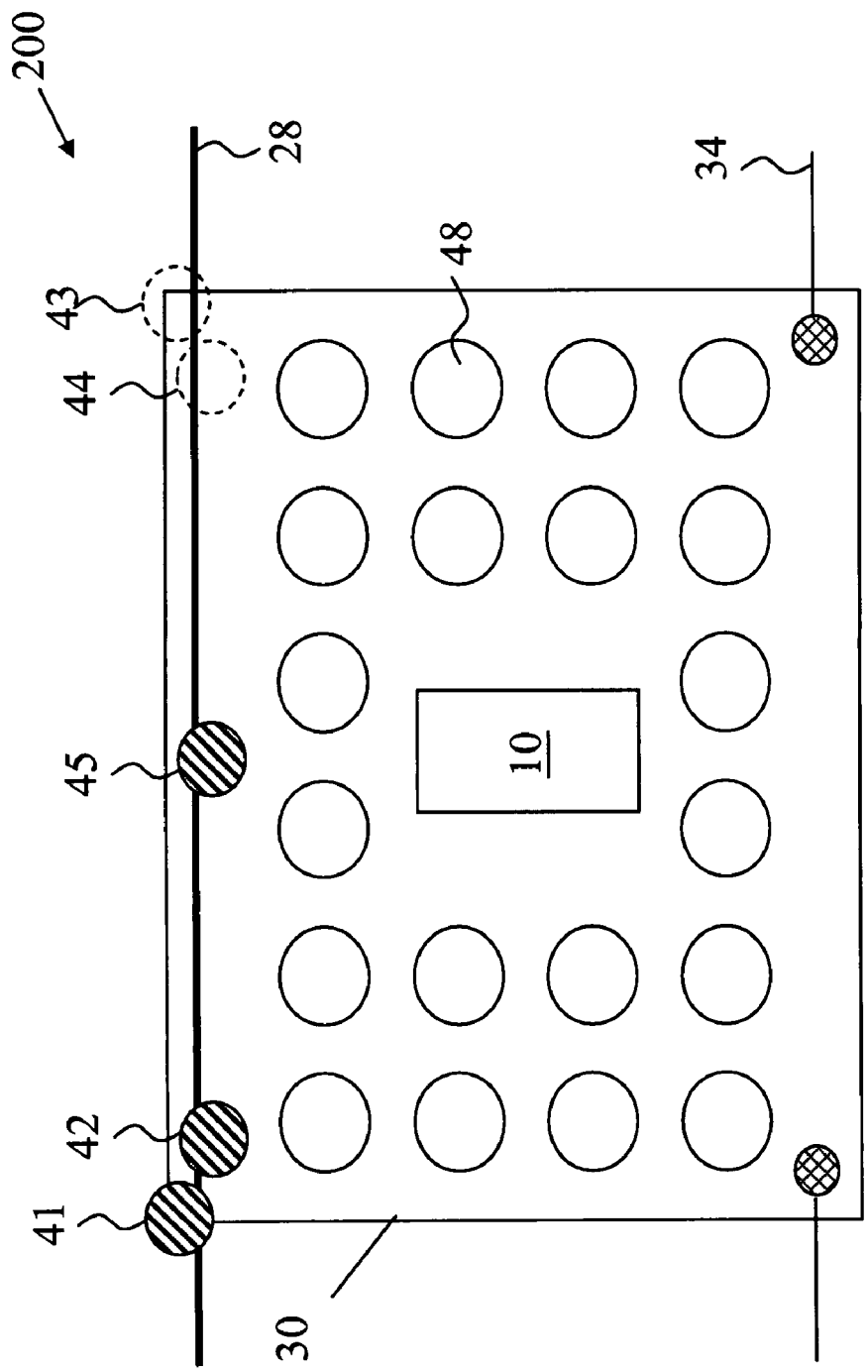
FIG. 2 is a schematic diagram of a tag equipment according to one example of the present invention.
Figure 3:
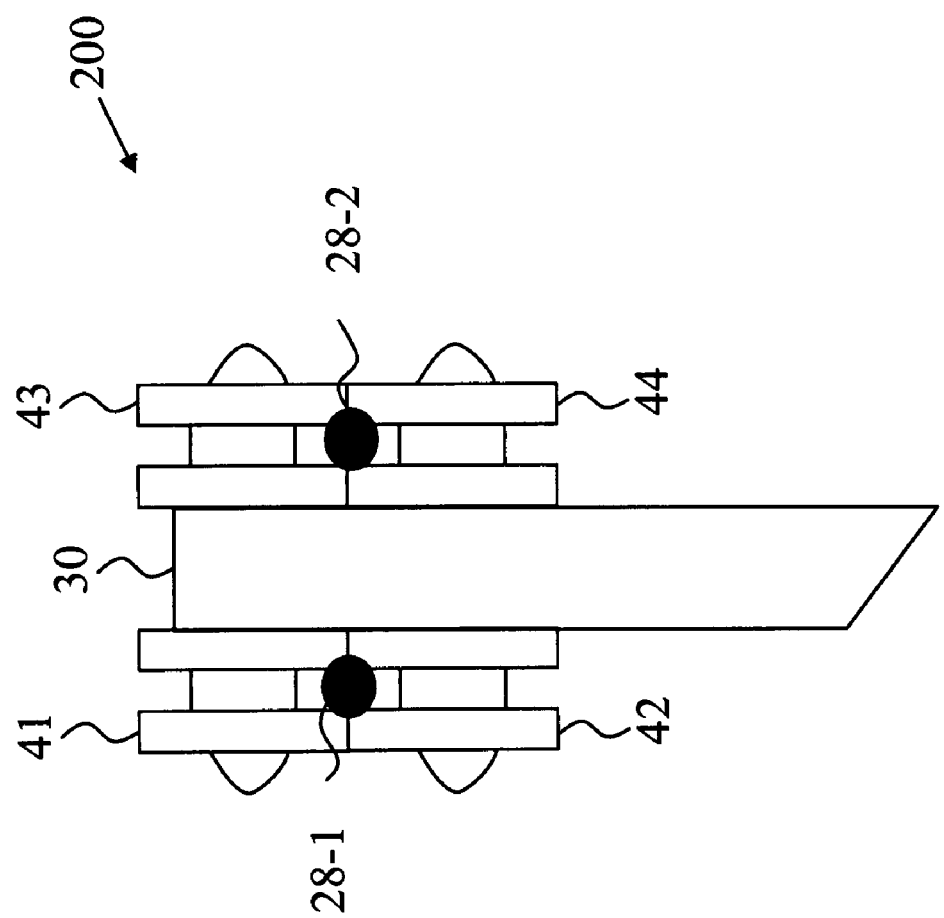
FIG. 3 is a cross-sectional diagram of the tag equipment illustrated in FIG. 2.

FIG. 2 is a schematic diagram of the tag equipment 200 according to one example of the present invention. FIG. 3 is a cross-sectional diagram of the tag equipment 200 illustrated in FIG. 2. Referring to FIGS. 2 and 3, the main support cable 28 may include a pair of cords 28-1 and 28-2, and may be held by holding devices to allow the carrier plate 30 to move along. The holding devices may include, for example, a first pair of wheels 41 and 42 mounted on a first surface of the carrier plate 30 for supporting the cord 28-1, and a second pair of wheels 43 and 44 mounted on a second surface of the carrier plate 30 for supporting the cord 28-2 at an upper portion. Each of the wheels 41-44 includes a grooved rim for accommodating the main support cable 28. The wheels 41 and 43 may be attached to the carrier plate 30 above the main support cable 28, while the wheels 42 and 44 may be attached to the carrier plate 30 below the main support cable 28, so that the grooved rims of the wheels 41-44 may be properly aligned for accommodating the main support cable 28. As a result, the carrier plate 30 is configured for sliding along the main support cable 28. Furthermore, an additional wheel 45 having a grooved rim may be mounted between the first and second pair of wheels 41 to 44 in order to provide better support for the carrier plate 30. The carrier plate 30 may include a plurality of recessed portions or holes 48, which may help reduce the weight of the carrier plate 30 and facilitate a relatively smooth operation. Therefore, the carrier plate 30 with the attached RFID tag 10 is configured for moving along the main support cable 28 stably at a relatively high speed. On the other hand, the carrier plate 30 is supported by the cable 34 of the pulley apparatus 24. The speed and the direction of the carrier plate 30 as it moves along the main support cable 28 may thus be controlled by the tag control system 20 through the pulley apparatus 24 and the motor 22. Consequently, the tag equipment 200 illustrated in FIG. 2 may be tested by adjusting the test conditions listed in Table 1.

Figure 4:
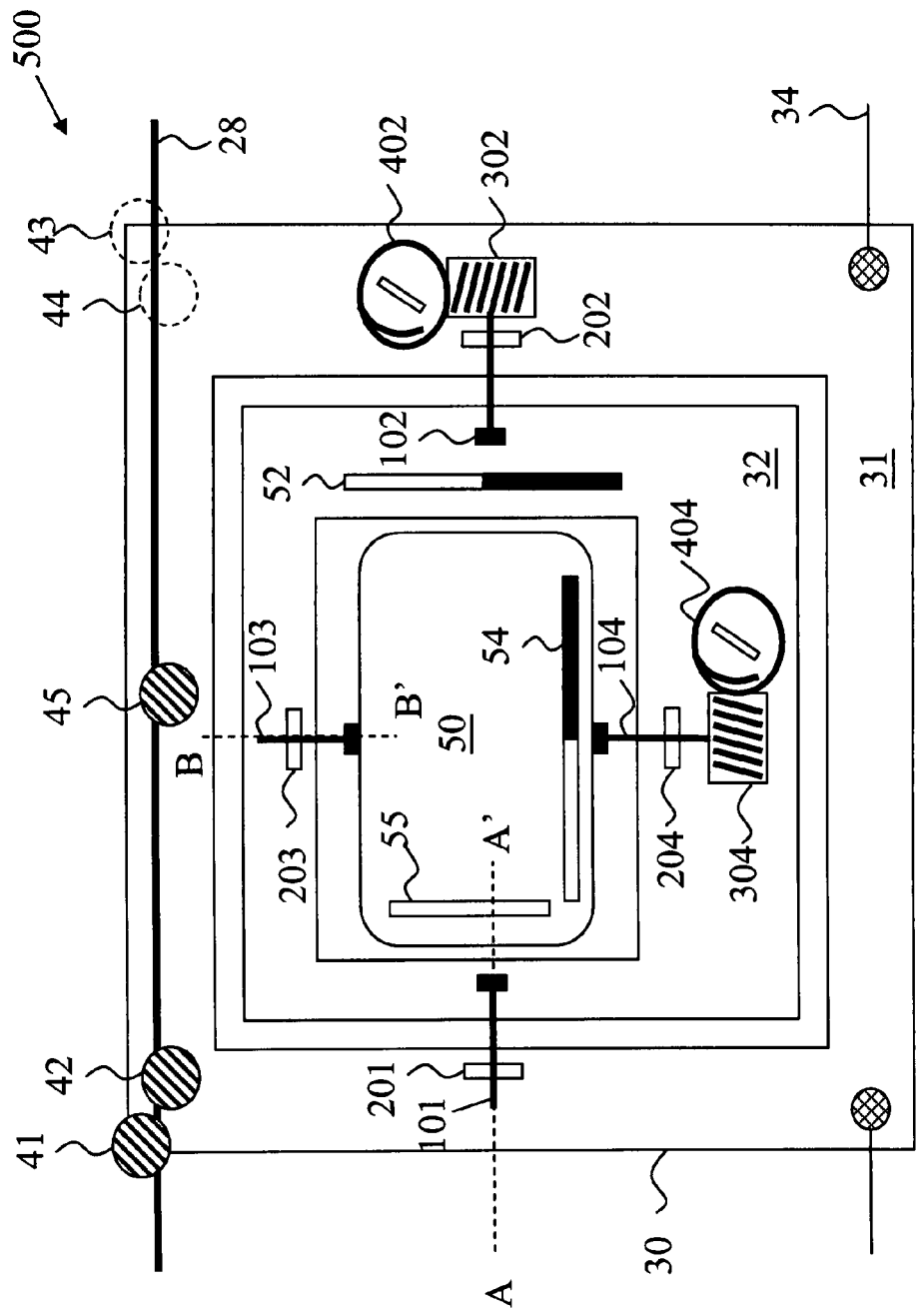
FIG. 4 is a schematic diagram of a tag equipment according to another example of the present invention.

FIG. 4 is a schematic diagram of the tag equipment 500 according to another example of the present invention. Referring to FIG. 4, the carrier plate 30 of the tag equipment 500 includes a first portion 31 and a second portion 32. A drum wheel 50 in the second portion 32 includes a slot 55 for accommodating the RFID tag 10. Referring also to FIG. 3, the main support cable 28 is held by the holding devices 41 to 44 attached to the first portion 31 of the carrier plate 30. The second portion 32 of the carrier plate 30 is pivotally connected to the first portion 31 by a first pivoting apparatus including, for example, shafts 101, 102 and bearings 201, 202. The second portion 32 is rotatable with respect to the first portion 31 along a first axis in the A-A' direction. The shaft 101 includes a first end connected to the first portion 31 of the carrier plate 30 via the bearing 201, and a second end connected to the second portion 32 of the carrier plate 30. Furthermore, the shaft 102 includes a first end connected to a first worm gear 302 mounted on the first portion 31 of the carrier plate 30 via the bearing 202, and a second end connected to the second portion 32 of the carrier plate 30. By controlling the rotation of the first worm gear 302 using a first angle controller 402, the second portion 32 of the carrier plate 30 is configured for pivoting around the first axis.

Likewise, the drum wheel 50 may be pivotally connected to the second portion 32 of the carrier plate 30 by a second pivoting apparatus including, for example, shafts 103, 104 and bearings 203, 204. The drum wheel 50 is rotatable with respect to the second portion 32 along a second axis in the B-B' direction. The shaft 103 includes a first end connected to the second portion 32 of the carrier plate 30 via the bearing 203, and a second end connected to the drum wheel 50. Furthermore, the shaft 104 includes a first end connected to a second worm gear 304 mounted on the second portion 32 of the carrier plate 30 via the bearing 204, and a second end connected to the drum wheel 50. By controlling the rotation of the second worm gear 304 using a second angle controller 404, the drum wheel 50 is configured for pivoting around the second axis.

In one example consistent with the present invention, a first photo encoded stripe 52 may be attached to the second portion 32 of the carrier plate 30 to provide information on the rotation of the second portion 32 of the carrier plate 30 along the first axis. Furthermore, a second photo encoded stripe 54 may be attached to the drum wheel 50 to provide information on the rotation of the drum wheel 50 along the second axis.

Figure 5:
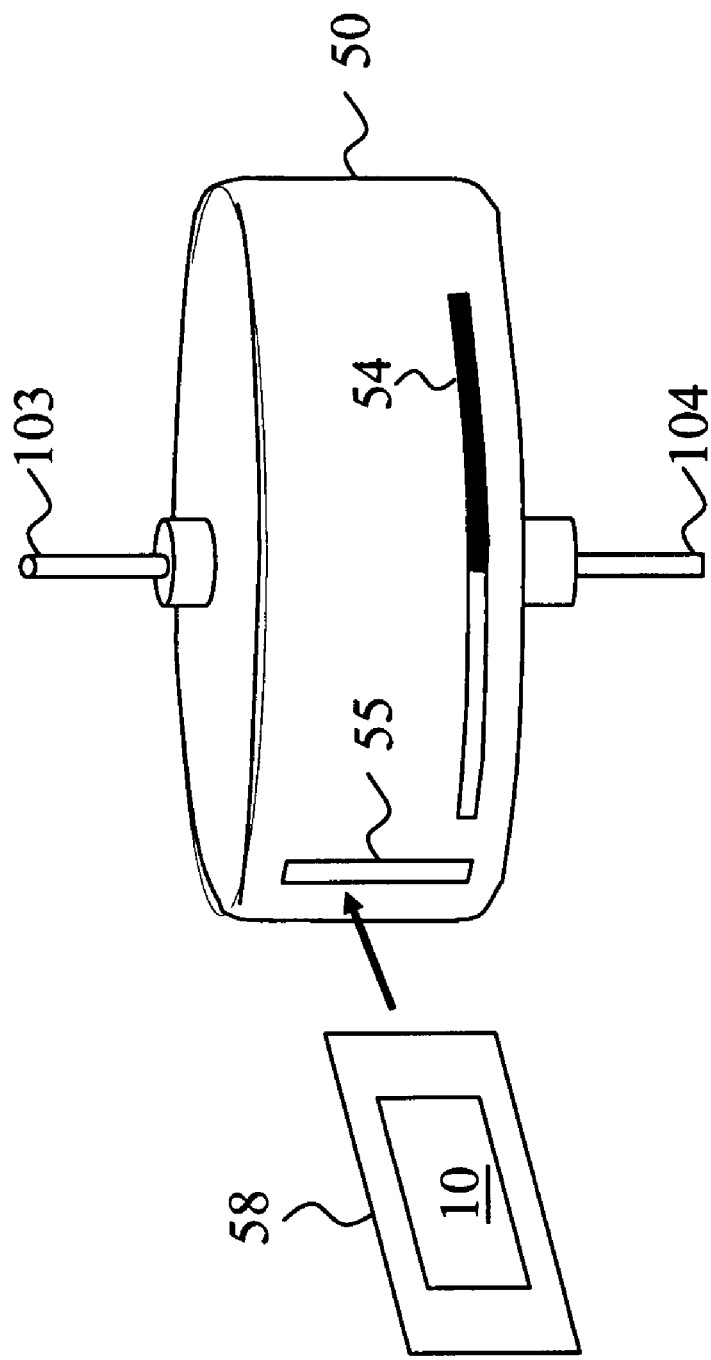
FIG. 5 is a schematic diagram of a drum wheel illustrated in FIG. 4.

FIG. 5 is a schematic diagram of the drum wheel 50 illustrated in FIG. 4. Referring to FIG. 5, the RFID tag 10 may be attached to a cartridge 58, which in turn is accommodated in the slot 55 of the drum wheel 50. Each of the photo encoded stripes 52 and 54 may include at least two regions of different colors, for example, black and white. A photo sensor (not shown) corresponding to the photo encoded stripe 52 or 54 may be provided to determine whether the drum wheel 50 or the second portion 32 rotates. The photo sensor may be arranged to face a region of the photo encoded stripe 52 or 54 so that a color change due to the rotation of the drum wheel 50 or the second portion 32 may be detected. Based on the collected information on rotation, the tag control system 20 is able to calculate the current orientation of the RFID tag 10. By controlling the angle controllers 402 and 404, the orientation of the RFID tag 10 may be adjusted at different test conditions under the "Tag orientation." Furthermore, by controlling the pulley apparatus 24, the test conditions under the "Tag speed" may be adjusted. The drum wheel 50 in one example may include a cylindrical form to facilitate rotation with respect to the second portion 32 or alleviate air turbulence when moving along the main support cable 28.

In the above noted examples, all components in the tag equipment 200 may be made of non-metallic materials such as, for example, plastic, nylon or polymer. Therefore, the RF field will not be affected and the data of the RFID tag 10 may be read correctly. Furthermore, skilled persons in the art will understand that in addition to the wheels 41-45, more wheels may be used for connecting the carrier plate 30. Moreover, the holding devices are not limited to the wheels 41 to 45. Other devices, such as rollers, that enable the carrier plate 30 to move or slide along the main support cable 28 may be possible.

In describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. A system for testing a radio frequency identification (RFID) device, the system comprising:
a carrier plate configured for carrying an RFID device;
a first cable configured for supporting the carrier plate;
a pulley apparatus configured for transporting the carrier plate along the first cable; and
a controller configured for adjusting test parameters in testing the RFID device.

2. The system of claim 1, further comprising:
at least one wheel attached to a surface of the carrier plate.

3. The system of claim 1, wherein the first cable is held by a first pair of wheels attached to a first surface of the carrier plate and a second pair of wheels attached to a second surface of the carrier plate.

4. The system of claim 1, wherein the first cable includes a first cord and a second cord, the system further comprising:
a first set of holding device configured for holding the first cord; and
a second set of holding device configured for holding the second cord.

5. The system of claim 4, further comprising:
a first wheel attached to a first surface of the carrier plate above the first cord; and
a second wheel attached to the first surface of the carrier plate below the first cord.

6. The system of claim 5, further comprising:
a third wheel attached to a second surface of the carrier plate above the second cord; and
a fourth wheel attached to the second surface of the carrier plate below the second cord.

7. The system of claim 6, further comprising:
a fifth wheel attached to one of the first and second surfaces of the carrier plate.

8. The system of claim 1, wherein the carrier plate includes at least one of recessed portions or holes.

9. The system of claim 1, wherein the carrier plate includes:
a first portion configured for moving along the first cable; and
a second portion pivotally connected to the first portion.

10. The system of claim 9, further comprising a drum wheel pivotally connected to the second portion of the carrier plate.

11. The system of claim 10, further comprising a first photo sensitive device at the second portion of the carrier plate.

12. The system of claim 11, further comprising a second photo sensitive device at the drum wheel.

13. The system of claim 10, further comprising:
a first set of connecting device configured for pivotally connecting the first and second potions of the carrier plate along a first axis; and
a second set of connecting device configured for pivotally connecting the second portion of the carrier plate and the drum wheel along a second axis.

14. The system of claim 13, further comprising a first worm gear configured for adjusting the first set of connecting device.

15. The system of claim 13, further comprising a second worm gear configured for adjusting the second set of connecting device.

16. The system of claim 14, further comprising:
a first angle adjuster configured for adjusting the first worm gear.

17. The system of claim 15, further comprising:
a second angle adjuster configured for adjusting the second worm gear.

18. The system of claim 1, wherein the carrier plate, the first cable and the pulley apparatus are made of non-metallic materials.

19. A system for testing a radio frequency identification (RFID) device, the system comprising:
a carrier plate including a first portion and a second portion pivotally connected to the first portion;
a cable configured for supporting the carrier plate;

a pulley apparatus configured for transporting the carrier plate along the cable; and a rotating device pivotally connected to the second portion of the carrier plate.

20. The system of claim 19, wherein the second portion is rotatable with respect to the first portion in order to position the REID device at a first orientation.

21. The system of claim 20, wherein the rotating device is rotatable with respect to the second portion in order to position the RFID device at a second orientation.

22. A method of testing a radio frequency identification (RFID) device, the method comprising:

providing a carrier plate including a first portion and a second portion;

pivotally connecting the second portion to the first portion;

providing a cable configured for supporting the carrier plate;

providing a pulley apparatus configured for transporting the carrier plate along the cable;

providing a rotating device;

pivotally connecting the rotating device to the second portion of the carrier plate;

rotating the second portion with respect to the first portion to position the RFID device at a first orientation; and rotating the rotating device with respect to the second portion to position the RFID device at a second orientation.

\* \* \* \* \*